United States Patent [19]

Smith

[11] Patent Number: 5,730,065
[45] Date of Patent: Mar. 24, 1998

[54] CONSOLE SUPPORT TABLE FOR AUTOMOBILES

[76] Inventor: David B. Smith, 4490 Conc. 4, Amherstburg, Ontario, Canada, N9V 2Y9

[21] Appl. No.: 511,719

[22] Filed: Aug. 7, 1995

[51] Int. Cl.⁶ .................................... A47B 37/00
[52] U.S. Cl. ................. 108/44; 224/555; 108/116; 108/90
[58] Field of Search ................. 108/42, 44, 47, 108/48, 45, 116, 148, 90, 93; 224/543, 550, 555, 277, 282, 400; 297/135, 188.15, 160

[56] References Cited

U.S. PATENT DOCUMENTS

| | | | |
|---|---|---|---|
| 348,706 | 9/1886 | Weiner | 108/115 |
| 955,523 | 4/1910 | Lytle | 297/162 |
| 995,142 | 6/1911 | Homsher et al. | 108/97 |
| 1,446,665 | 2/1923 | Schiefer et al. | 108/148 X |
| 1,549,957 | 8/1925 | Belden | 108/166 X |
| 1,851,600 | 3/1932 | Stanley | 108/43 |
| 2,580,144 | 12/1951 | Webster | 108/50 |
| 2,804,126 | 8/1957 | Palmer | 297/160 |
| 3,031,242 | 4/1962 | Sawle, III | 312/257.1 X |
| 3,061,394 | 10/1962 | Whetstone | 312/140.4 |
| 3,198,144 | 8/1965 | Cullinan | 108/48 |
| 3,632,158 | 1/1972 | Boothe | 296/37 R |
| 4,341,418 | 7/1982 | Chappell | 108/44 X |
| 4,577,788 | 3/1986 | Richardson | 224/273 |
| 4,715,296 | 12/1987 | Wilkinson | 108/116 |
| 4,743,050 | 5/1988 | Small | 281/45 |
| 4,938,439 | 7/1990 | Fried et al. | 248/118.5 |
| 5,085,153 | 2/1992 | McKee | 108/44 |
| 5,170,720 | 12/1992 | Scheurer | 108/44 |
| 5,322,021 | 6/1994 | Jackson | 108/44 |

FOREIGN PATENT DOCUMENTS

| | | | |
|---|---|---|---|
| 825959 | 12/1937 | France | 108/134 |
| 655122 | 12/1935 | Germany | 248/188.2 |

*Primary Examiner*—Peter M. Cuomo
*Assistant Examiner*—Janet M. Wilkens
*Attorney, Agent, or Firm*—Don Halgren

[57] ABSTRACT

A planar writing surface is attached to a vertically arrangable support panel for engagement next to an automobile console. The support panel has a pair of side edges which each have a vertically adjustable support leg thereon. Each support leg may be independently heightwise adjustable to each touch the floor of the auto next to the console, and provide rigidity to the writing surface. The writing surface panel may flip onto the support panel through an arc of 270 degrees, about its common hinge.

6 Claims, 3 Drawing Sheets

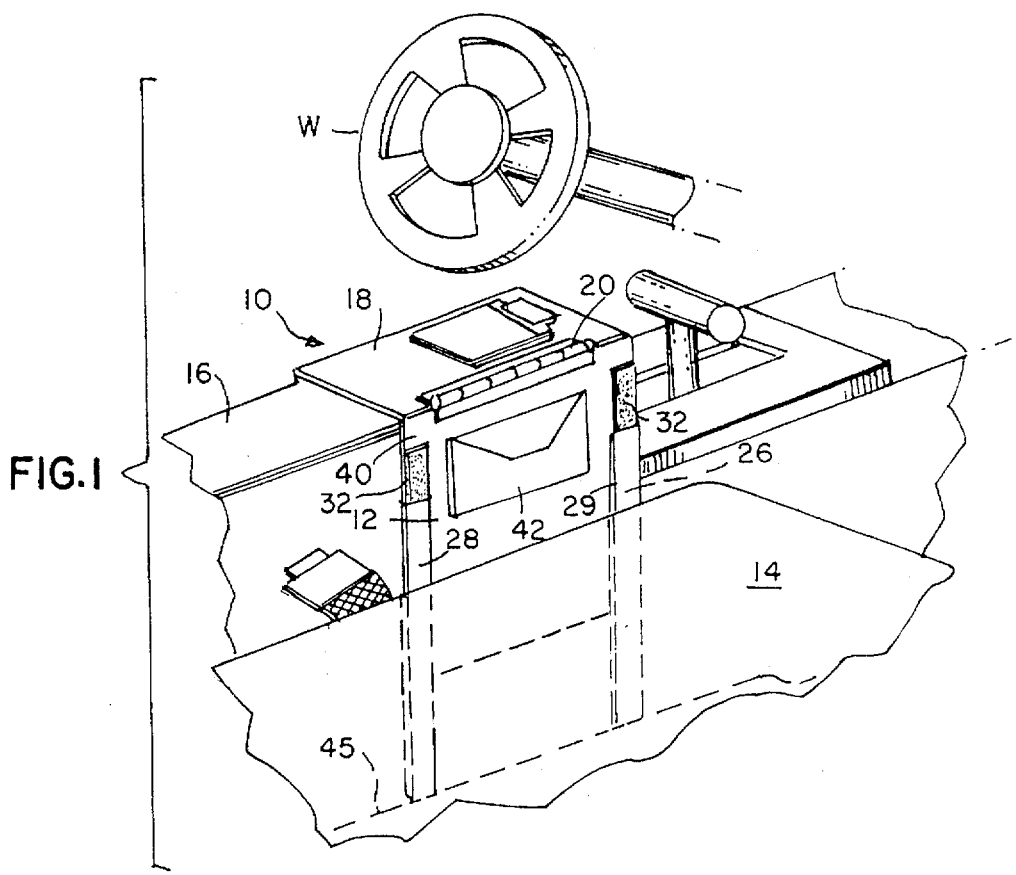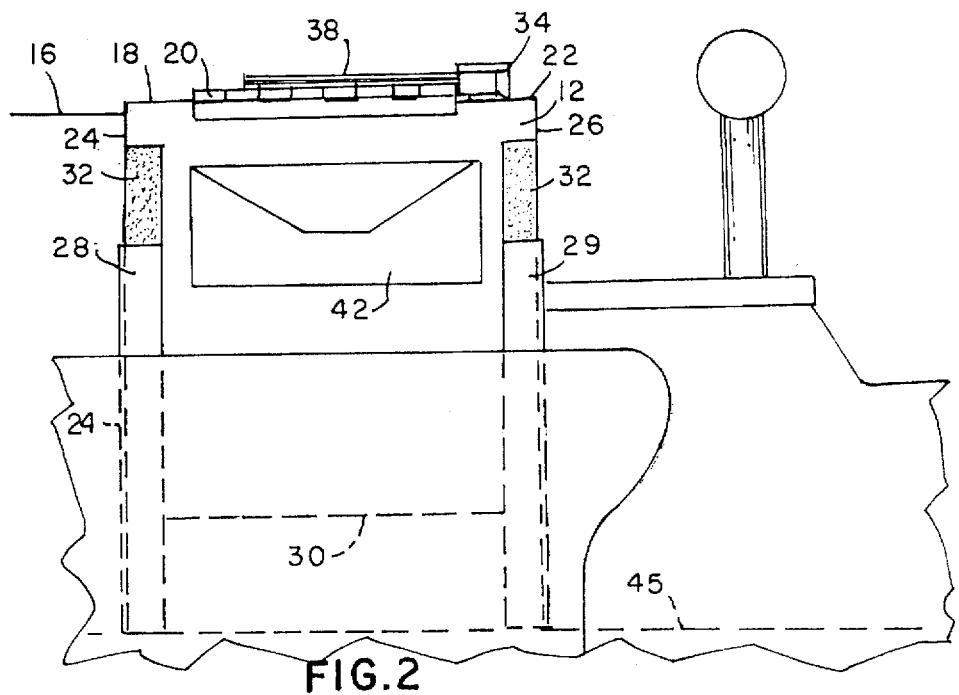

CONSOLE SUPPORT TABLE FOR AUTOMOBILES

BACKGROUND OF THE INVENTION

1. Field of the Invention

This invention relates to utility console accessories for automobiles, and more particularly to a foldible writing surface for use on an automobile console or armrest.

2. Prior Art

Writing surfaces in automobiles, are generally very hard to come by. Typically, a small pad is held to smooth surface such as a windshield, by a suction cup and tablet, on which a driver may make notes upon occasion. Unfortunately this suction cups fall off, the tablets are difficult to reach and they don't permit much support when writing thereon.

Other attempts at providing automobile writing support surfaces are shown in U.S. Design Pat. No. 353,275 to Longhurst, which shows an automobile desk with a privacy screen. The surfaces are limited by it's apparent inability to be adjustable and articulable.

A further arrangement for a portable desk, is shown in U.S Pat. No. 5,322,021 To Jackson. This patent shows a desk with a foldable leaf and it also has a carrying handle, so that the user may carry it from car to car. This device unfortunately, is not readily removable so as to permit the user to rest his arm on the console itself.

A food service table, is shown in U.S. Pat. No. 5,170,720 to Scheurer. This food service table is arranged to fit between a pair of bench seats in an automobile, having a forward end which is adjustable, so as to permit leveling of the table prior to using it. This arrangement unfortunately does not readily flip out of the way, nor does it appear to be storable in place, while permitting access to a console therebeneath, nor can it be utilized with center consoles.

An arrangement for enclosing a console in it entirety, is shown in U.S. Pat. No. 5,085,153 to McKee. This structure has a housing which appears to enclose the console, to provide a writing surface and support surface on its top thereof. However, this structure does not permit ready access to the console nor does it appear readily removable.

A shopping cart clip board is shown in U.S. Pat. No. 4,743,050 to Small. This clip board assembly has a bracket which is bolted to the front of a shopping cart, with a writing surface which may be flipped down when not in use. This arrangement may be satisfactory for a shopping cart, but it would not be desirable for an automobile console because of the way it is required to be attached, and the fact that the writing surface itself folds downwardly into the shopping cart.

U.S. Pat. No. 4,577,788 to Richardson shows a portable desk container having a clipboard on a box, the box having several drawers slidable therewithin. An adjustable leg on the bottom side of the box fits on to the dashboard of an automobile. This arrangement is a potential safety hazard as well as being likely difficult for a driver to reach and utilize.

A vehicle console itself, is shown in U.S. Pat. No. 3,632,158 to Boothe. This console is arranged to be placed on a vehicle seat between the driver and passenger side and has a writing surface thereon for the occupant's use.

It is an object of the present invention to overcome the shortcomings of the prior art.

It is a further object of the present invention, to provide a desk-like structure which is adaptable for use of a console of a car.

It is yet a further object of the present invention, to provide a desk/writing surface structure which is adaptable to fit any car with a pre-existing console or central gear shift lever.

BRIEF SUMMARY OF THE INVENTION

The present invention comprises a foldable desk which is adaptable to be utilized with the center console or armrest in almost any automobile.

The foldable desk comprises a generally rectangularly shaped support panel, which is typically arranged in a vertical orientation when it is utilized in an automobile between the passenger seat and the driver's seat and an adjacent console or armrest.

The desk assembly also comprises an upper articulable writing surface of generally rectangular shape. The writing surface and the support panel are attached to one another along a common hinge which is arranged there between. The hinge on the support panel is disposed on its uppermost edge, or may be integrated into each panel.

The support panel has a pair of generally parallel side edges, and a support leg is adjustably, securably arranged on each of these side edges of the support panel. Each leg may be secured at a different extended distance from a lowermost edge of the support panel. The support panel may have an elongated strip of fastening material commonly known under the trade name of Velcro, as elongated strips thereon. Each support leg may also have an elongated strip of Velcro thereon, as to engage the Velcro strip on the support panel. Alternatively, each elongated leg may be of "L" shape or "U" Channel shape in cross-section, so as to matingly engage the edge portions of the support panel.

The sides of the support panel may be comprised of generally "U" or "C" shaped channels or guide rails, which each may slidably enclose an elongated leg shaped to mate with the channel. Preferably, a "thumb-screw" would be disposable through each respective leg and edge or channel on the sides of the panel, to secure them together, once their floor engaging disposition has been set.

The articulable writing surface, has a first or writing side, having a securement clip on its forwardmost end. The securement clip permits the attachment of a writing pad, paper or map or the like, to the articulable writing surface. The support panel has an outwardly directed first surface having a pocket for article support means thereon, on which the user may store writing instruments, maps/documents, or the like.

In operation of the desk assembly, the support panel with its attached legs, is slid alongside an armrest or console between it and the adjacent passenger seat. Each of the legs on the side of the support panel are adjusted so as to have their lowermost ends strike the floor of the automobile at the side of the console or armrest. Once this is done, the adjustable legs may be securely mated with the sides of the support panel through the gripping means such as the thumb screws through the sides of the panels/channels and respective legs, or with several strips of the Velcro or other suitable attachment arrangement. This is done with the articulable writing surface arranged over the console or armrest in a desired flat or horizontally disposed orientation.

When it is desired not to have the writing surface on top of the console or armrest, and otherwise getting in the way thereof so as to not permit the user of the armrest to access what ever may be on the console or therewithin, the articulable writing surface may be folded about the hinge between the writing surface and support panel into a side orientation in which the writing surface is vertically disposed adjacent the support panel.

Thus the driver of the automobile, may utilize the softer armrest, for access what ever may be within the console therebeneath. When the driver needs to make a notation, he merely flips the articulable writing surface up around the hinge through an arc of 270 degrees, and have it rest on to top surface of the armrest or console.

Thus what has been shown as a unique automobile writing surface which permits both simplicity of use, universality of fitting within any car having an armrest or a console, while permitting normal regular use of that armrest or console when the writing surface is not needed.

BRIEF DESCRIPTION OF THE DRAWINGS

The objects and advantages of the present invention will become more apparent, when viewed in conjunction with the following drawings, in which:

FIG. 1 is a perspective view of a foldable desk arranged between the front seats of an automobile, and on an armrest;

FIG. 2 is a side elevational view of the foldable desk shown in FIG. 1;

DESCRIPTION OF THE PREFERRED EMBODIMENTS

Figure 3:
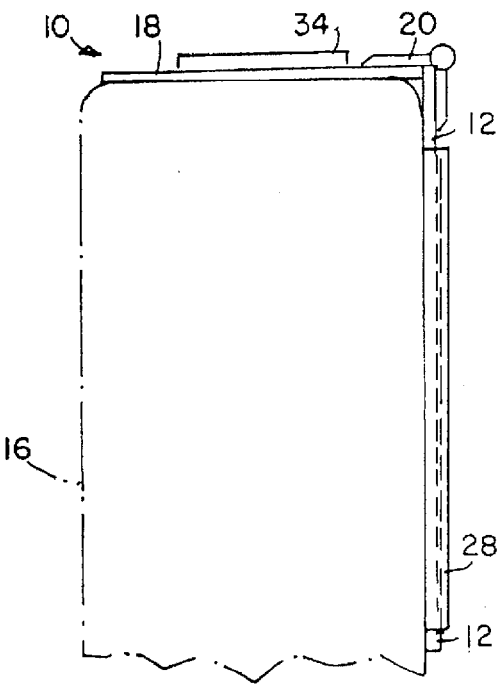
FIG. 3 is an end view of the foldable desk.

The present invention comprises a fold able desk which is adaptable to mate over the center console or armrest in almost any automobile.

The foldable auto desk 10, as shown in FIG. 1, comprises a generally rectangularly shaped support panel 12, which is typically arranged in a vertical orientation when it is utilized in an automobile between the passenger seat 14 and the driver's seat, not shown, and adjacent a console or armrest 16, and by the steering wheel "W".

The desk assembly 10 also comprises an upper articulable writing surface 18 of generally rectangular shape. The writing surface 18 and the support panel 12 are attached to one another along a common hinge 20 which is arranged therebetween. The hinge 20 on the support panel 12 is disposed on its uppermost edge 22.

Figure 6A:
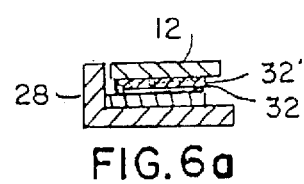
FIGS. 6a, 6b, 6c and 6d, are cross-sections of several embodiments of the leg supports.
Figure 6B:
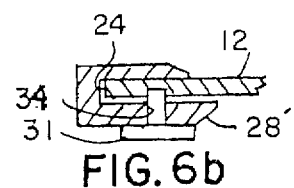
Figure 6C:
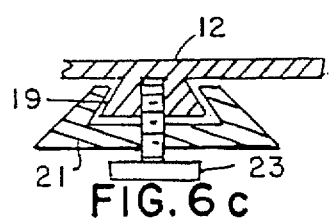
Figure 6D:
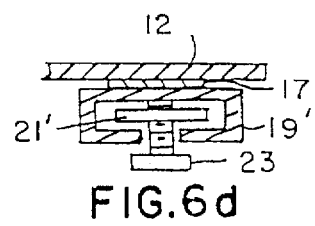

The support panel 12 has a pair of generally parallel side edges 24 and 26, with a support leg 28 and 29 independently, adjustably arranged on each of these side edges 24 and 26 of the support panel 12. Each leg 28 or 29 may be secured at a different extented distance from a lowermost edge 30 of the support panel 12. The support panel 12 may have an elongated strip of fastening material 32 known under the trade name of Velcro, as the elongated strip thereon. Each support leg 28 and 29, may also have an elongated strip 32 of Velcro thereon, as to engage the Velcro strip on the side edge 24 and 26 of the support panel 12. Each elongated leg 28 and 29 may be of "L" shape or "U"-Channel shape in cross-section, so as to engage the edge portions of the support panel, as may be seen in cross-sectional views thereof, in FIG. 6a. The support leg 28' shown in FIG. 6b, is of channel shape, for engagement of an edge 24 or 26 therein. A pin 31 is shown movably disposed through a hole 33 in the support leg 28, which pin 31 may mate with any of a plurality of holes or ridges spaced along the edges 26 and 24 of the support panel 12 for this particular support arrangement. Alternatively, each side of the support panel 12 preferably has an extruded "U" shaped channel 19 thereon, as shown in cross-section in FIG. 6c, with a "C" shaped leg 21, or extruded therewith or attached by adhesive 17, onto a "C" shaped channel 19' with a linear leg 21', as shown in FIG. 6d. Each leg 21 or 21' would be slidably adjustable in each channel 19 or 19' and secured therein by a thumb-screw 23 or the like disposed between the leg and its respective channel.

The articulable writing surface 18, has a first or writing side, having a securement clip 34 on its forwardmost end 36. The securement clip 34 permits the attachment of a writing pad or map 38 or the like, to the upper side of the articulable writing surface 18. The support panel 12 has an outwardly directed first surface 40 having a pocket 42 in which the user may store writing instruments, maps or the like.

In operation of the desk assembly 10, the support panel 12 with any of its pairs of adjusatably slidably attached legs 28 and 29, (or 21, or 21' or 28'), may be slid alongside an arm rest or console 16 between it and the adjacent passenger seat 14. Each of the legs 28, as shown in FIGS. 1 and 2 on the sides 24 and 26 of the support panel 12, are adjusted so as to have their lowermost ends strike the floor 45 of the automobile, at the side of the console 16 or armrest. Once this is done, the adjustable legs 28 and 29 maybe securely mated with the sides 24 and 26 of the support panel 12 through the gripping means of the Velcro 32 or other suitable attachment arrangement such as the pin 31 is shown in FIG. 6b, or preferably, similar to the thumb screw 23 mated between the exemplary leg 21 and the side of the panel 12, as shown in FIGS. 6c or 6d, or the like. This is done with the articulable writing surface 18 arranged over the console or armrest 16 in a desired flat or horizontally disposed orientation so as to properly define the desired orientation of the writing surface 18.

Figure 4:
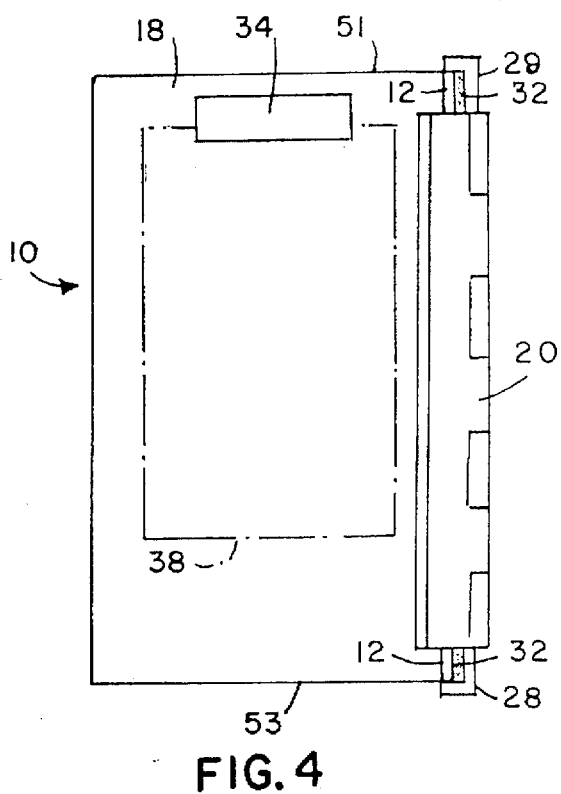
FIG. 4 is a planar view of the foldable desk shown in FIG. 3.
Figure 5:
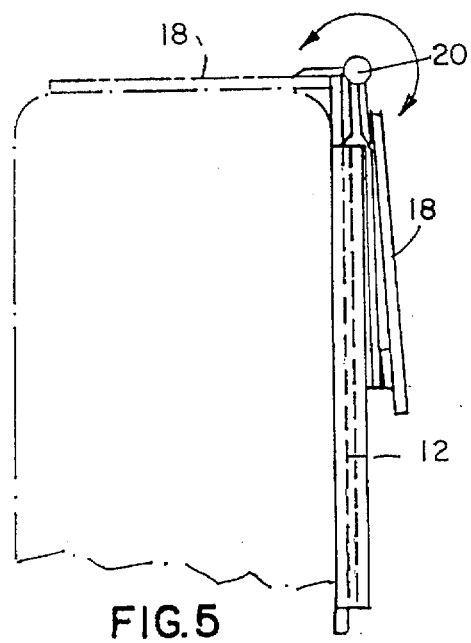
FIG. 5 is a end view of the foldable desk in a folded configuration.

When it is desired not to have the writing surface 18 on top of the console or armrest 16, and otherwise getting in the way thereof so as to not permit the user of the armrest 16 to access whatever may be on the console or therewithin, the articulable writing surface 18 may be folded about the hinge 20 between the writing surface 18 and support panel 12, into a side orientation in which the writing surface 18 is generally vertically disposed adjacent the support panel 12, as shown in FIG. 5. That is, the panel 18 flips about a 270 degree arc, from the position shown in FIGS. 3 and 4, to that shown in FIG. 5.

Thus the driver of the automobile may utilize the softer armrest, for access what ever may be within the console therebeneath. When the driver needs to make a notation, he or she merely flips the articulable writing surface up around the hinge through an arc of 270 degrees, and have it rest on the top surface of the armrest or console.

Figure 7:
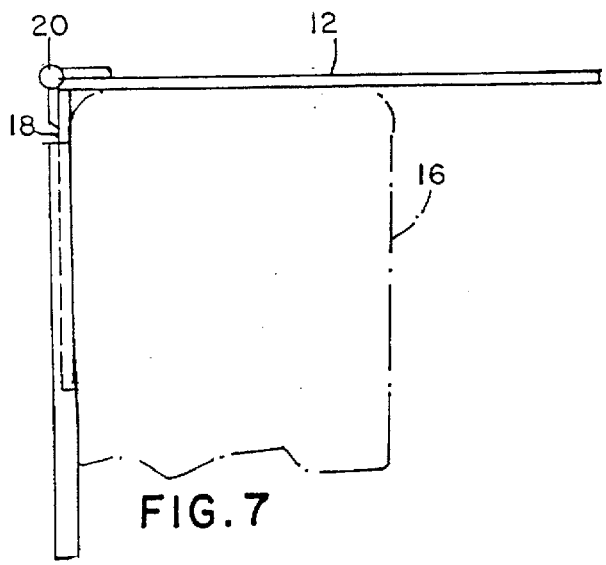
FIG. 7 is an alternative embodiment of the desk.

It is to be noted that typically the support 12 has greater dimensions than the writing surface 18. The legs 28 and 29 may be moved to the side edges 51 and 53, as shown in FIG. 4, so that the smaller panel 18 may be disposed into a vertical orientation, to provide a longer panel 12 on which to write. This configuration is shown in FIG. 7 to provide the larger writing support surface.

Figure 8:
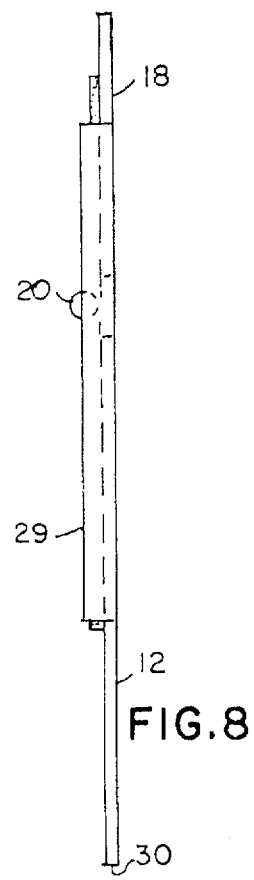
FIG. 8 is yet a further embodiment of the desk.

In yet a further embodiment of the desk assembly 10, as shown in FIG. 8, the writing panel 18 and the support panel 12 may be held in a common plane by the support legs 28 and 29 bridging both panels 12 and 18, so as to make a table top for a still further enlarged support surface, which then need not necessarily be limited to disposition over a console.

Thus what has been shown is a unique automobile writing surface which permits both simplicity of use, universality of fitting within any car having an armrest or a console, while permitting normal regular use of that armrest or console when the writing surface is not actually needed.

I claim:

1. A convertible covering table for automobile consoles, arranged to permit access to a console or to cover it to provide a rigid writing surface thereover, comprising:

a first planar support panel having an upper edge and a pair of side edges;

a planar writing surface hingedly attached to said upper edge of said planar support panel; and a pair of independent support legs, each leg of said pair of legs being individually, adjustably arranged on the respective side edges of said support panel to adjustably extend downwardly to a lower floor location of an automobile;

said support legs have securement means arranged to secure said legs against said support panel without further slippage with respect thereto;

said side edges of said support panel of generally "U" shaped cross-section, arranged to receive said support legs therewithin;

said table thereby arranged to permit a user to supportively cover an auto console with said writing surface, or to pivot said writing surface away from covering a console, over and against said support panel.

2. The convertible covering table as recited in claim 1, wherein each of said support legs may be disposed at different elevational locations on their respective sides.

3. The convertible covering table as recited in claim 1, wherein said planar writing surface includes a clamp means for securing any documents/paper means thereon.

4. The convertible covering table as recited in claim 1, wherein said support panel includes an enclosure means attached thereto, for carrying writing instruments and paper material therein.

5. The convertible covering table as recited in claim 3, wherein said writing surface has means for attaching said clamp means thereto.

6. The convertible covering table as recited in claim 1, wherein said support legs are slidably arranged on both said support panel and said writing surface in a common flat planar configuration.

* * * * *